United States Patent [19]

Frazier

[11] Patent Number: 4,837,683

[45] Date of Patent: Jun. 6, 1989

[54] HIDDEN FAULT BIT APPARATUS FOR A SELF-ORGANIZING DIGITAL PROCESSOR SYSTEM

[75] Inventor: Malcolm Frazier, Medfield, Mass.

[73] Assignee: The United States of America as represented by the Secretary of the Air Force, Washington, D.C.

[21] Appl. No.: 789,862

[22] Filed: Oct. 21, 1985

[51] Int. Cl.[4] .................. G06F 11/00; G06F 15/16
[52] U.S. Cl. .................. 364/200; 371/11; 371/16
[58] Field of Search .................. 371/16, 11; 364/200 MS File, 900 MS File

[56] References Cited

U.S. PATENT DOCUMENTS

| | | | |
|---|---|---|---|
| 4,321,666 | 3/1982 | Tasar et al. | 364/200 |
| 4,371,952 | 2/1983 | Schuck | 364/900 |
| 4,443,849 | 4/1984 | Ohwada | 364/200 |
| 4,453,210 | 6/1984 | Suzuki et al. | 364/200 |
| 4,553,201 | 11/1985 | Pollack, Jr. | 364/200 |
| 4,589,090 | 5/1986 | Downing et al. | 364/900 |
| 4,618,954 | 10/1986 | Otobe et al. | 371/16 |
| 4,639,917 | 1/1987 | Furuta | 371/16 |

Primary Examiner—Gareth D. Shaw
Assistant Examiner—Christina M. Eakman
Attorney, Agent, or Firm—William Stepanishen; Donald J. Singer

[57] ABSTRACT

A hidden fault bit apparatus for a self-organizing digital processor system utilizing a single bit of non-volatile memory to store a hidden fault bit in each digital processor unit of the system. The hidden fault bit indicates that the digital processor which contains it, is believed to contain a hidden fault and therefore, should not participate in the self-organization process.

2 Claims, 1 Drawing Sheet

HIDDEN FAULT BIT APPARATUS FOR A SELF-ORGANIZING DIGITAL PROCESSOR SYSTEM

STATEMENT OF GOVERNMENT INTEREST

The invention described herein may be manufactured and used by or for the Government for governmental purposes without the payment of any royalty thereon.

BACKGROUND OF THE INVENTION

In the prior art, there exists a major problem in the design of self-organizing fault tolerant systems which are utilized in digital processor systems. The problem involves the difficulty in making the system organize itself reliably in the presence of one or more hidden faults within any one or more digital processor in the system. When these hidden faults are present, they create a major problem in the reliability of the system since they are not disclosed by self-diagnosis procedures in each digital processor of the system. These faults may be hidden because they are intermittent, or because the self-diagnosis procedures do not cover them. Such faults may disrupt the process of self-reorganization and the resulting system operations thereafter.

The task of reducing or eliminating hidden faults in self-organizing computer or digital processor systems is alleviated, to some degree, by the following U.S. Pat. Nos.:

4,443,849 issued to Hiroyuki Ohwada on Apr. 17, 1984;

4,453,210 issued to Suzuki et al on June 5, 1984; and 4,321,666 issued to Tasar et al on Mar. 23, 1982.

In a modern LSI or VLSI environment, the problem of hidden faults in a self-organizing digital processor system may become acute. Each digital processor may consist of only a few integrated circuits, or even only one. With present technology, such integrated circuits have either a read-only-memory, or a volatile read-write memory. Thus each digital processor loses any and all alterable information in the event of a loss of power. A system of such digital processors often has to operate without manual intervention during key portions of its life cycle. Examples of such systems are spaceborne systems throughout their life or real-time military systems, or even real-time commercial systems, such as nuclear reactor control systems, to take an extremely critical example.

SUMMARY OF THE INVENTION

The present invention utilizes a single bit of non-volatile memory to store a hidden fault bit in each digital processor unit that is operating in a system of self-organizing digital processor units. In a faulty digital processor unit, the hidden fault bit can be activated by either the digital processor unit itself or by some external means. Once activated, the hidden fault bit introduces a delay in the operation of its digital processor unit which prevents its participation in the self-organizing procedure.

It is one object of the present invention, therefore, to provide an improved hidden fault bit apparatus for a self-organizing digital processor system.

It is another object of the invention to provide an improved hidden fault bit apparatus utilizing a single bit of non-volatile memory in each digital processor.

It is another object of the invention to provide an improved hidden fault bit apparatus wherein the hidden fault bit may be set by either an internal or external command.

It is another object of the invention to provide an improved hidden fault bit apparatus wherein the hidden fault bit may be read by either its own digital processor or an external one.

It is another object of the invention to provide an improved hidden fault bit apparatus which delays the start of its own digital processor in the self-organizing process.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
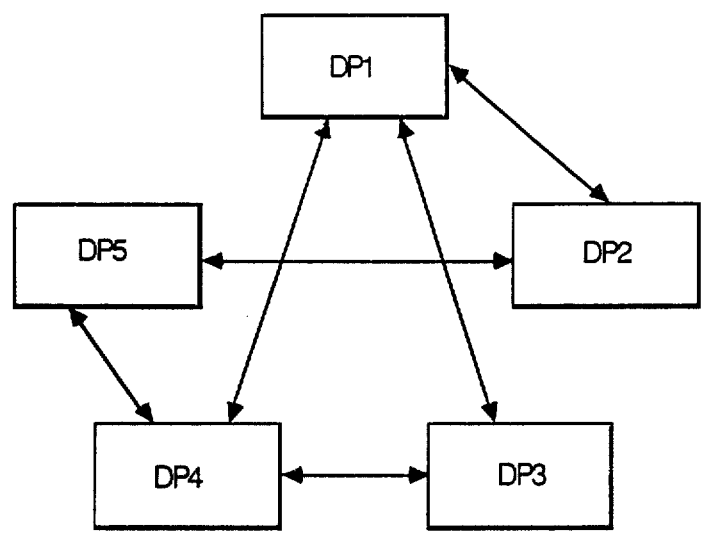
FIG. 1 is a block diagram of the self-organizing digital processor systems of the prior art, and, FIG. 2 is a block diagram of the hidden fault bit apparatus as it is utilized in a digital processor unit.

Referring now to FIG. 1, there is shown a block diagram of a self-organizing digital processor system wherein a plurality of digital processor units, DP1–DP5 are utilized. These digital processors are connected by some system of buses, by means of which messages may be passed from one processor to another. At certain times in the life of the system, information contained in each digital processor concerning how the system is organized may be lost. At such times each digital processor first attempts to determine if it is itself operational. If a digital processor passes its own diagnostics, it attempts to communicate with other processors by means of messages. If a digital processor determines itself to be faulty, it awaits external action, which will not be attempted until the network is organized.

In the case where some processors in the network have hidden faults, there exists fault processors as participants in the self-organization procedure. Sometimes, other digital processors in the system can recognize this fact, isolate the offending digital processor, and either ignore its messages or turn it off while the self-organization procedure is active. However, recognition of faults by other digital processors has the same imperfections and limitations as self-diagnosis procedures within an individual digital processor. Therefore, it must be assumed that the potential existence of hidden faults are capable of preventing the network of digital processors from organizing itself into a working unit. Note that once the system has organized itself, it is presumed to be capable of identifying digital processors with hidden faults.

Figure 2:
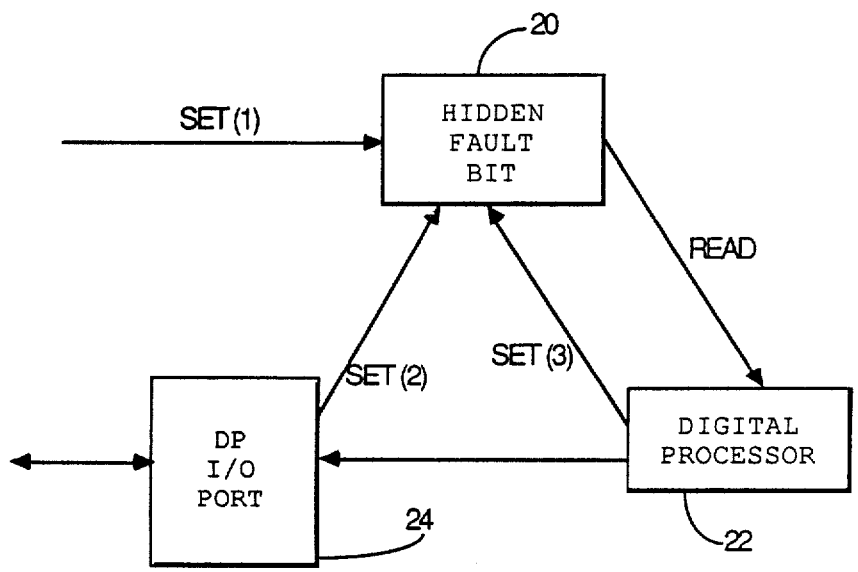

Turning now to FIG. 2, there is shown a block diagram of the hidden fault bit apparatus which comprises a hidden fault bit unit 20. The hidden fault bit unit 20 will be incorporated in a digital processor unit 22 which will comprise one such digital processor DP1–DP5, as shown in FIG. 1. The digital processor unit 22 includes the digital processor I/O port unit 24 by which the set command signal, SET(2) may be applied to the hidden fault bit unit 20. As indicated in FIG. 2, the set command signal to the hidden bit fault unit 20 may be applied from either an external source, SET(1) or by the digital processor unit, SET(3). The hidden fault bit may also be read by the digital processor unit 22.

The hidden fault bit apparatus provides the means and the method of use of this means to materially improve the reliability of self-organizing digital processor systems in the presence of hidden faults. The hidden fault bit apparatus comprises a single bit of non-volatile memory in each of the digital processors in the self-organizing system. This single bit may, if necessary or required, be alterable only once from its initial state or configuration. Thus, the hidden fault bit apparatus may be implemented by use of existing PROM technology that could be incorporated into the LSI chip or chips which form the digital processor. There are other forms of non-volatile "read-mostly" memories that are also available. The purpose of the hidden fault bit is to indicate the fact that the digital processor which contains it, is believed to contain a hidden fault and therefore, should not normally participate in the self-organization process. The hidden fault bit (or HFB) could be set by a software command from the digital processor which contains the hidden fault bit. Alternatively, the hidden fault bit could be set by external command from another source, such as one or more of the other digital processors in the self-organizing system. This external command could be either a direct command to the hidden fault bit, or a command that is mediated by the I/O hardware of the digital processor which contains the hidden fault bit. The hidden fault bit, need only be read by the software of the digital processor that contains the fault bit although an external read out of the fault bit may also be utilized. The hardware configuration for the use of the hidden fault bit apparatus in a self-organizing digital processor system is shown in FIG. 2.

The hidden fault bit would be set during operation of a fully organized digital processor network, which is presumed to have the capability of identifying hidden faults within the system of digital processors. The following set of commands will be utilized with the hidden fault bit apparatus:

SET (1): HFB Set directly by external device.
SET (2): HFB Set by external command interrupted by I/O hardware.
SET (3): HFB Set by software in digital processor
READ: HFB Read by software in digital processor Note: "Set" may imply either a reversible or irreversible setting of the hidden fault bit to either 1 or 0. It should also be noted that it is not necessary that the hidden fault bit be read by the software of the digital processor which contains a hidden fault. It is sufficient, however, that the setting of the hidden fault bit cause a time delay in starting the digital processor which contains it until after a system reset. This time delay must be greater than the self-organization time of the digital processor system. Such a time delay may be accomplished by either a hardware means such as a one shot or counter unit, or by a software means.

As was mentioned in the note above, the hidden fault bit is utilized to introduce a time delay in the digital processor which contains the hidden fault bit. The purpose of this time delay is to permit the digital processor system to organize itself without any interference from digital processors which contain hidden faults. Once the digital processor system is fully organized, it is presumed to be capable of dealing with the digital processors that contain hidden faults. One way to deal with the defective digital processors would be to turn them off.

It will be recognized, therefore, that a key part of the present invention is that the hidden fault bit merely delays the participation of its digital processor in the self-organization process. If the hidden fault bit were used to initially turn off its digital processor, a new failure mode would then be introduced into the digital processor system. This failure mode would consist of a system-wide command or series of commands turning on all the hidden fault bits. This would either turn off all the digital processors immediately, or else it would turn them all off at the next system restart time. Neither condition is tolerable. By making the hidden fault bit merely force a time delay on restart, the system vulnerability will be minimized. If a system fault should cause all the hidden fault bits to be turned on, then there would be only two consequences. First, the self-organization time would be longer, since all the digital processors would be delayed by the same amount. Second, the digital processors which contain the hidden faults, would participate in the self-organization process, if any such digital processors were present. However, this situation is no worse than having a digital processor system without hidden fault bits in the first place. Thus by making the hidden fault bits introduce a time delay into the self-organizing procedure, rather than turning off a digital processor, the failures which involve hidden fault bits do not degrade the reliability of the system that contains them relative to a system which does not contain them.

In summary, the use of the hidden fault bit as described here solves the problem by preventing digital processors which contain hidden faults from participating in the self-organization process. It further solves the problem without having the solution introduce additional failure modes. The hidden fault bit apparatus provides the method of making a digital processor system self-organizing in a reliable manner in the presence of hidden faults. Current practice either ignores the problem or utilizes two or more digital processors which act simultaneously at each digital processor node. These two digital processors continually compare the outputs (at every bus transfer cycle, for instance) to note when a hidden or diagnosible fault has occurred in one of them. However, it can be readily seen that one non-volatile but alterable bit as a digital processor node involves far less hardware than a entire spare processor.

The second important novel feature of the hidden fault bit apparatus is the fact that a time delay is introduced, rather than making a digital processor node inoperable. As noted above, the time delay will be sufficient to allow the system to organize itself, which is the object of the invention. The fact that it is a time delay rather than an on-off switch, prevents the operation of the hidden fault bit apparatus from degrading the system reliability that it is designed to enhance.

The principle advantage of the present hidden fault bit apparatus is that it solves the problem of making a digital processor system self-organizing in the presence of hidden faults in a very simple, economical, and reliable way. Simplicity is important because pure software solutions to the problem as stated have proven so complex that their feasibility and efficiency are in doubt. Economy is evidenced by the fact that only a single bit of memory in each digital processor is required. Reliability is evidenced by the fact the the introduction of the hidden fault bit can be done in a "fail-soft" way, so that failure of this additional item of hardware does not degrade system reliability. Thus the cure is not worse than the disease.

The only disadvantages of the system are as follows. First, an additional hardware element is introduced. This only corresponds to a single bit of non-volatile memory per digital processor. Second, in the presence of an extremely unlikely failure mode wherein all hidden fault bits have been set the system startup time is increased by a factor of at least two. However, this operation is better than not having the system start up at all, due to a hidden fault.

The hidden fault bit apparatus invention was originally conceived as the solution to the problem of building a reliable space-borne network of real-time processors. However, the hidden fault bit apparatus is applicable to any space-borne digital processor processor network. Furthermore, the low cost of LSI microprocessors, and the high reliability which is required of many real-time systems, taken together means that many earthbound applications of computer networks will exist. These networks must always be capable of organizing themselves reliably, or the entire network becomes inoperable. A military avionics system must be capable of reliable in-flight reinitialization, for instance. On the commercial front, the computerized non-skid braking systems already exist for many cars and trucks. Brake systems are now required by law to have dual hydraulic subsystems, plus a manual backup (emergency brake). Equal redundancy will be required for the computerized control, and this implies a small network of digital processors. Many other commercial real-time networks that will require fault tolerance without human intervention will soon emerge, because of the present low cost of the hardware.

Although the invention has been described with reference to a particular embodiment, it will be understood to those skilled in the art that the invention is capable of a variety of alternative embodiments within the spirit and scope of the appended claims.

What is claimed is:

1. A hidden fault bit apparatus for a self-organizing digital processor system comprising in combination:

a plurality of digital processor units operatively connected to each other to pass messages therebetween and to participate in a self-organization procedure, each digital processor utilizes its own diagnostics to determine if it is itself operational, each digital processor that passes its own diagnostics, then, communicates with the other digital processors by means of messages, said self-organization procedure is completed when each digital processor that is operational has communicated with other digital processors in the system, and, a plurality of means for providing a hidden fault bit, each of said plurality of said hidden fault bit means operatively connected respectively to each digital processor of said self-organizing digital processor system, said plurality of said hidden fault bit means are set during operation of the self-organizing digital processor system, each of said plurality of said hidden fault bit means is utilized to indicate that the digital processor which contains it, contains a hidden fault and therefore, should not normally participate in the self-organization procedure, each of said plurality of said hidden fault bit means being in the form of a single bit of non-volatile memory, said hidden fault bit means prevents its own digital processor from participating in the self-organization procedure.

2. A hidden fault bit apparatus as described in claim 1 wherein the setting of the hidden fault bit introduces a time delay in its digital processor that is sufficient in length to prevent it from participating in the self-organizing procedure.

* * * * *